May 8, 1928.

E. J. BAGNALL 1,668,884

APPARATUS FOR PRODUCING GASEOUS OZONIDES

Original Filed April 17, 1918   5 Sheets-Sheet 1

Inventor
Ernest J. Bagnall.
By Hull, Brock & West
Attys.

May 8, 1928. 1,668,884
E. J. BAGNALL,
APPARATUS FOR PRODUCING GASEOUS OZONIDES
Original Filed April 17, 1918   5 Sheets-Sheet 2
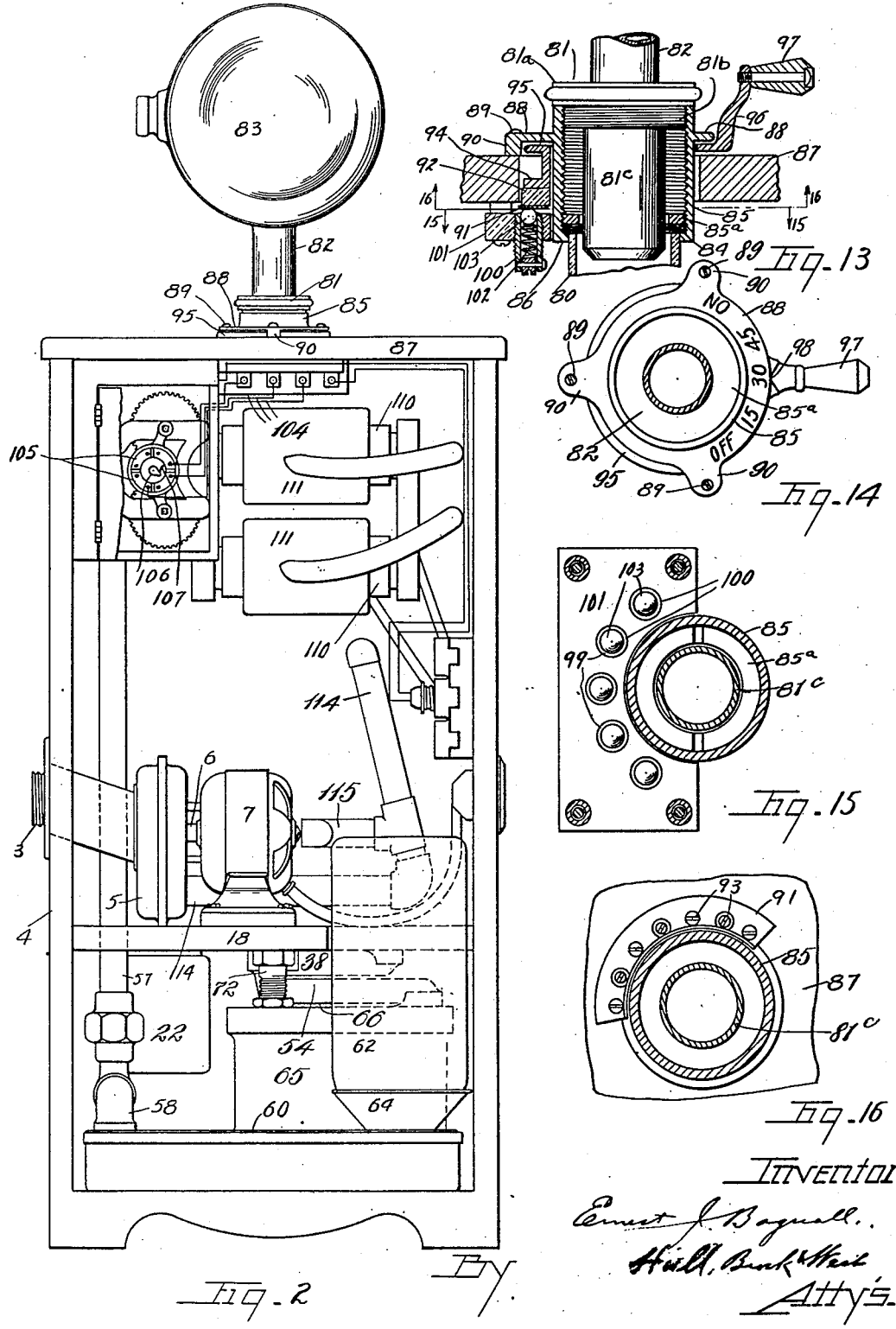
Inventor
Ernest J. Bagnall
Hull, Burk & Neil
Atty's May 8, 1928. 1,668,884
E. J. BAGNALL.
APPARATUS FOR PRODUCING GASEOUS OZONIDES
Original Filed April 17, 1918  5 Sheets-Sheet 3

Inventor
Ernest J. Bagnall
Attys.

May 8, 1928.  
E. J. BAGNALL  
1,668,884  
APPARATUS FOR PRODUCING GASEOUS OZONIDES  
Original Filed April 17, 1918     5 Sheets-Sheet 4

Inventor  
Ernest J. Bagnall.  
By  
Attys.

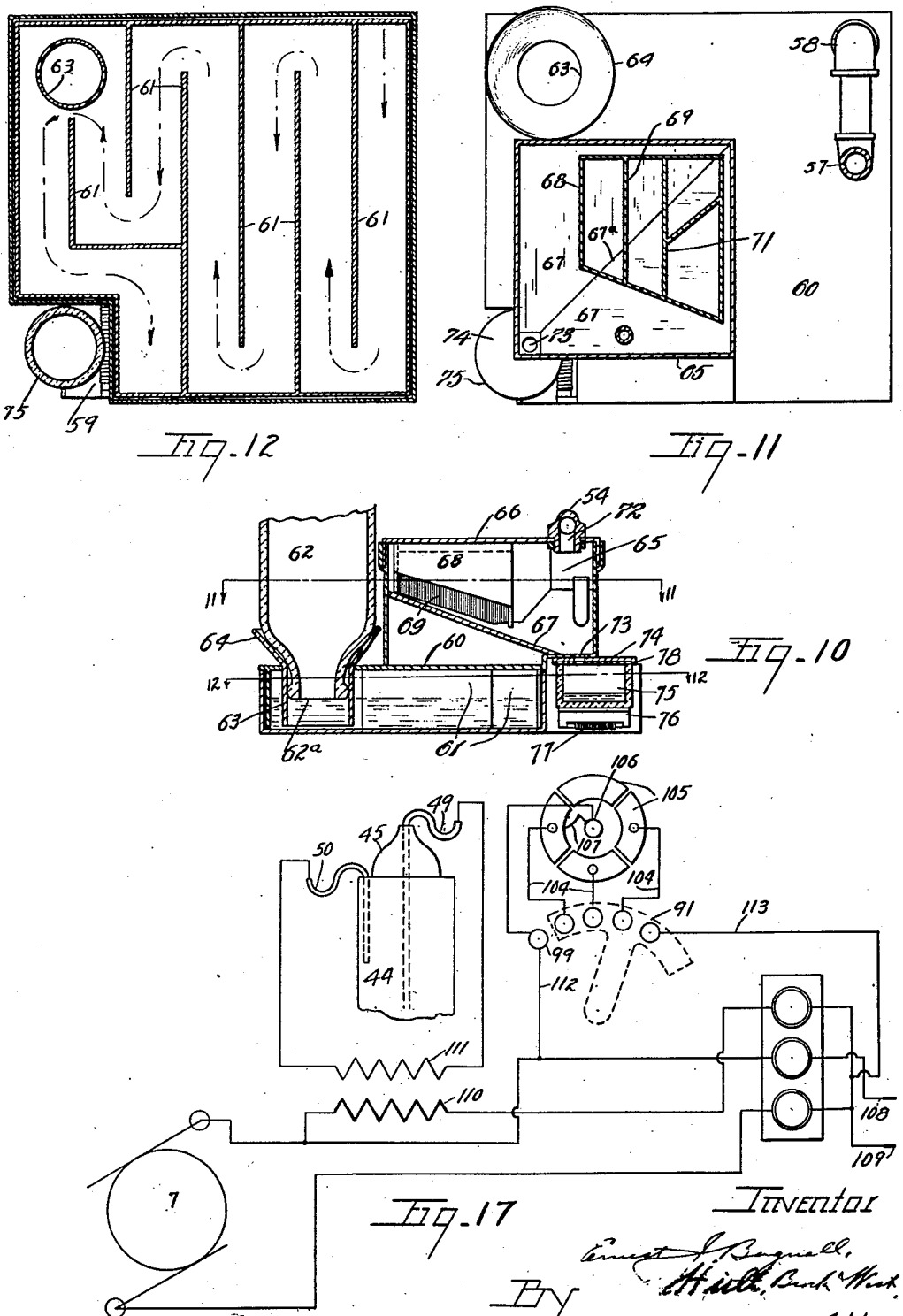

Patented May 8, 1928.

1,668,884

UNITED STATES PATENT OFFICE.

ERNEST J. BAGNALL, OF CLEVELAND, OHIO; ANNA M. BAGNALL, EXECUTRIX OF SAID ERNEST J. BAGNALL, DECEASED, ASSIGNOR TO KNOX TERPEZONE COMPANY, INC., A CORPORATION OF NEW JERSEY, AND KNOX TERPEZONE COMPANY OF AMERICA, INC., A CORPORATION OF WEST VIRGINIA.

APPARATUS FOR PRODUCING GASEOUS OZONIDES.

Continuation of application Serial No. 229,018, filed April 17, 1918. This application filed November 22, 1922, Serial No. 602,752. Renewed July 30, 1927.

This invention relates to apparatus for producing gaseous ozonides and is generally an improvement upon the apparatus shown, described and claimed in the patent to William John Knox No. 1,088,346 issued February 24, 1914, the general purpose and object of this invention being to produce an apparatus which, while of the general type disclosed in said patent, is adapted to perform its functions with a maximum efficiency and without requiring the attendance of a skilled operator, thereby enabling the apparatus to be installed in the home or apartment of the patient and to operate continuously and uninterruptedly without supervision. Further and more limited objects of the invention will appear hereinafter in the specification and will be pointed out and embodied in the claims hereto annexed.

Figures 1, 4:
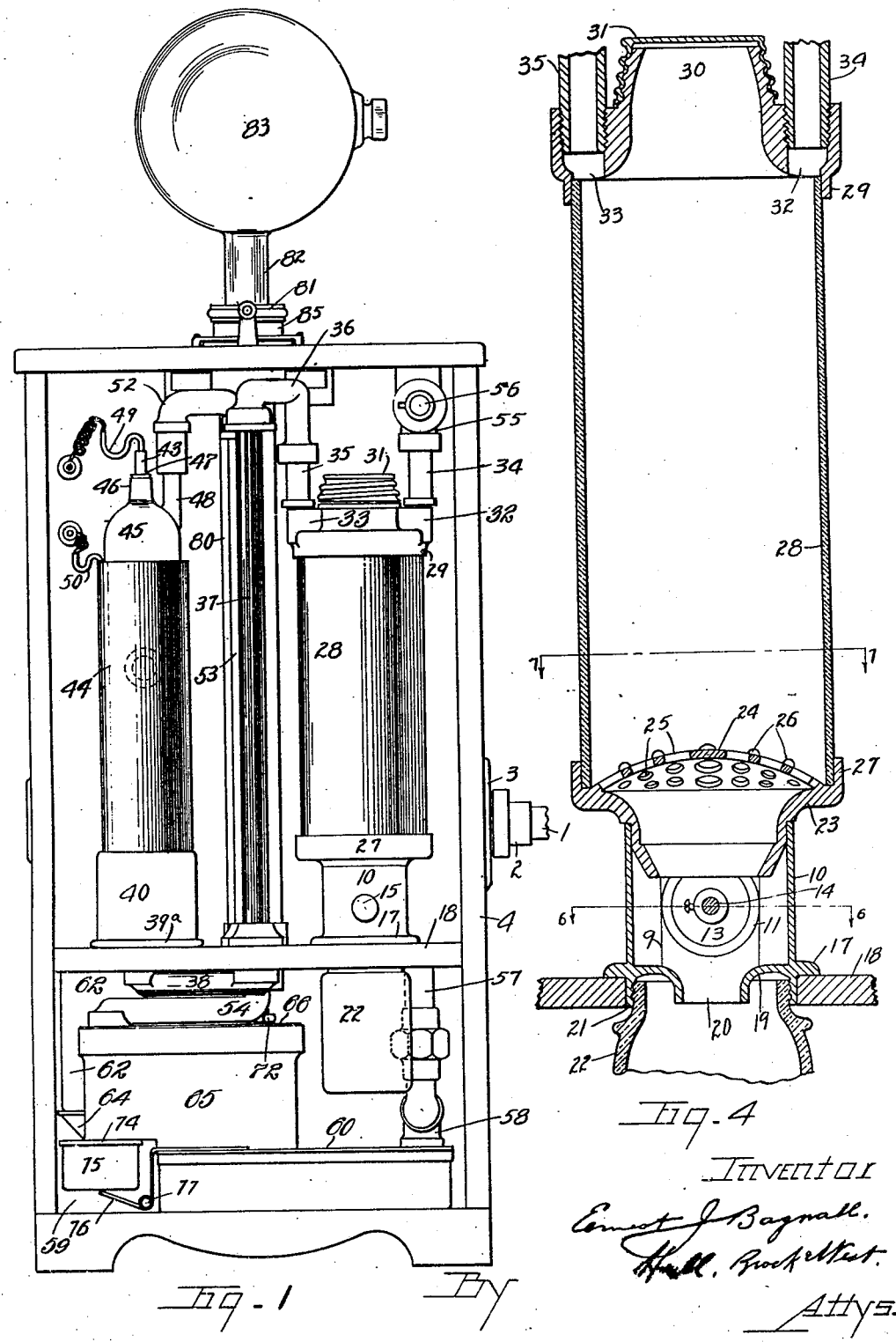
Figures 3, 5:
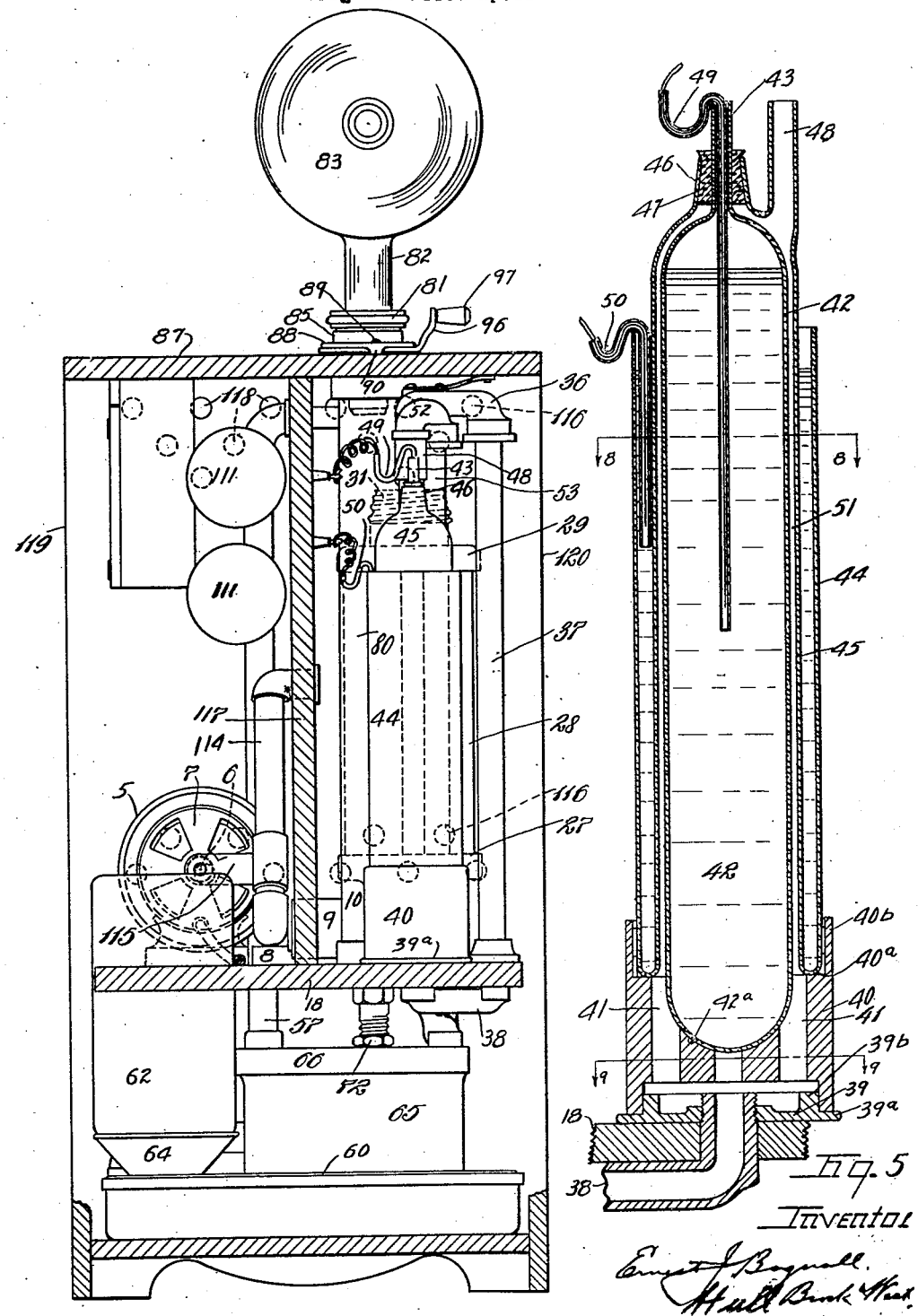
Figure 6:
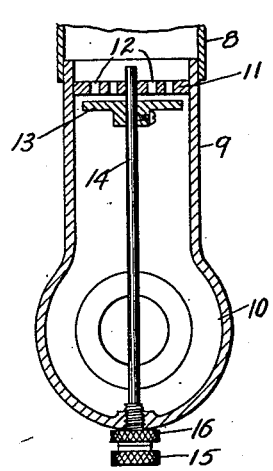
Figure 19:
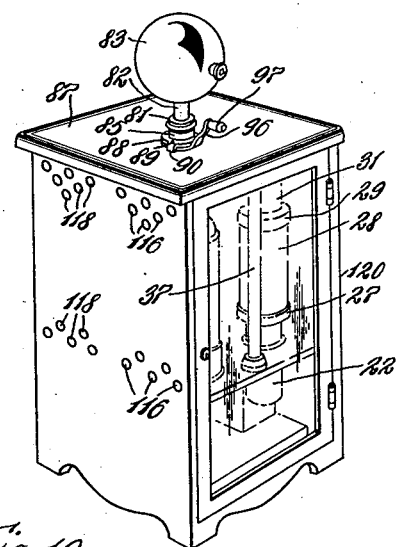
Figure 8:
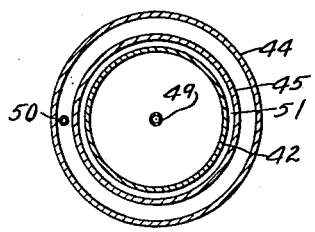
Figure 7:
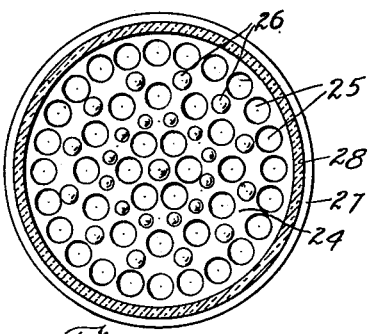
Figure 18:
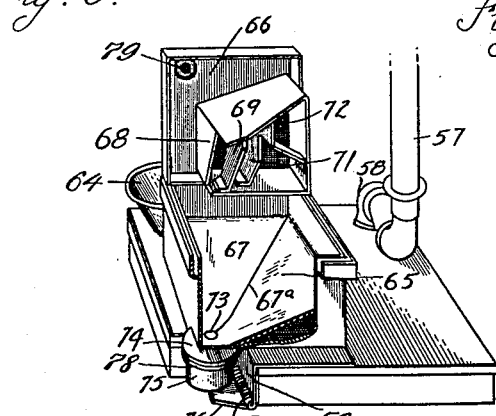
Figure 9:
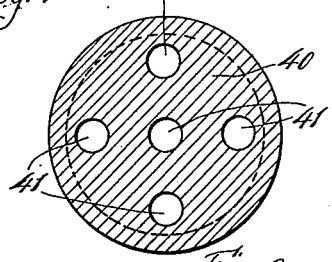

In the drawings forming part hereof, Fig. 1 represents a front elevation, Fig. 2 a rear elevation, and Fig. 3 a side elevation (with certain parts shown in section) of the apparatus; Fig. 4 is a vertical sectional view through the drying chamber and its connections; Fig. 5 a similar view through the ozone generator or ozonizer; Figs. 6 and 7 are sectional details of the air drying device corresponding respectively to the lines 6—6 and 7—7 of Fig. 4; Figs. 8 and 9 are sectional details through the ozone generator or ozonizer corresponding respectively to the lines 8—8 and 9—9 of Fig. 5; Fig. 10 is a vertical sectional view through the evaporating tank and its associated parts; Fig. 11 a horizontal sectional view corresponding substantially to the line 11—11 of Fig. 10, the supply tank or bottle being omitted; Fig. 12 a horizontal sectional view corresponding substantially to the line 12—12 of Fig. 10; Fig. 13 a detail in section and Fig. 14 a detail in plan of the controlling switch and its associated parts; Fig. 15 is a sectional plan view corresponding to the line 15—16 of Fig. 13; Fig. 16 a similar view looking upwardly; Fig. 17 is a diagrammatic view showing the electrical connections for supplying air to the apparatus and for operating the ozonizing device thereof; Fig. 18 a perspective view of the pinene tank and the mixing chamber, the cover of the latter being raised and certain parts being broken away; and Fig. 19 a perspective view of the cabinet or casing and the parts cooperating therewith.

In the embodiment of the invention disclosed herein, the apparatus comprises generally a fan with a flexible tubular connection for air; a motor driving said fan; a drying tube through which all the air supplied to the ozone generator and to the evaporating tank is conducted; an evaporating tank through which part of the air from the drying tube is conducted; an ozone generator through which the other part of the air from the drying tube is conducted; a mixing or commingling chamber wherein the vapor laden air from the tank and the ozone from the generator are mingled to produce pinene ozonide; a distributing globe for such pinene ozonide; a conduit for conducting air in excess of that required for the production of pinene ozonide to the ozone generator and to the motor thereby to cool the same; an electric time switch capable of adjustment whereby the apparatus may be run continuously, or for predetermined time intervals, as occasion may require; and a cabinet for the foregoing parts.

Describing by reference characters the various parts illustrated herein, 1 denotes a flexible tube the inlet end whereof may be inserted in an opening in a window board or other suitable source of fresh air supply and the delivery end whereof is provided with a coupling 2 which may be threaded onto a corresponding connection 3 projecting through one side of the cabinet 4 from the central inlet of a centrifugal fan 5 the shaft 6 whereof is driven by a motor 7. This motor is an induction motor specially wound to produce a constant speed under variable load and potential. The outlet 8 from the fan casing discharges into a connection 9 communicating with a chamber 10 beneath the drying tube, said connection and chamber being conveniently formed by a casting of the shape shown in Figs. 4 and 6. The connection 9 is provided with a partition 11 having apertures 12 therethrough, the volume of air supplied through these apertures to the drying tube being controlled by a disk valve 13 secured to a stem 14 extending through the front of the chamber 10 and threaded thereinto, the stem being provided with a knurled head 15 for convenience of manipulation and a knurled adjusting nut 16. The casting forming the chamber 10 is shown as provided with a horizontal flange 17 whereby the said chamber and the drying tubes thereabove may be supported upon a wall 18, conveniently formed as part of the cabinet. The bottom of said casting projects inwardly, as shown at 19 and is provided with a central discharge opening 20. The casting is also provided with a cylindrical wall 21 extending through the wall 18 and provided with an internal thread enabling it to support a Mason jar, or similar receptacle 22, having an externally threaded upper end. The top of the chamber 10 supports the bottom casting 23 of the drying tube. This casting is provided with an upwardly convex or dome shaped wall 24 for the drying agent, said wall having openings 25 therethrough with rounded projections 26 on the solid portions thereof between said openings. The casting 23 is provided, outside said wall, with a cylindrical flange 27 which receives therewithin the bottom of the tube 28, said tube being preferably of glass and having its upper end seated within the cylindrical flange 29 of the cover, conveniently formed as a casting and having a filling projection 30 at its top provided with a screw cap 31. The cover is provided with passageways 32, 33 from which the dried air is conducted, through pipes 34 and 35 threaded thereinto respectively, to the evaporating tank and the ozonizer.

The drying agent which is preferably used in the drying tube will be calcium chloride, and the construction of the dome shaped bottom 24 of the drying chamber has proven to be of marked advantage in that the openings 25 for the water extracted from the air will never clog, rendering the device absolutely reliable. The water thus extracted from the air is discharged through the opening 20 into the jar 22, which may be conveniently removed and emptied from time to time.

From the drying tube 28, air flowing through the connection 35 is conducted, through a connection 36, the glass tube 37, and the connection 38 below the wall 18 to the bottom of the ozone generator or ozonizer, the connection 38 being threaded into a cylindrical casting 39 having a bottom plate 39ª supported upon the wall 18 and a cylindrical flange 39ᵇ centering the bottom of a cylindrical supporting member 40 beneath the ozonizer receptacle. This supporting member 40 is preferably of wood and is provided with a plurality of passageways 41 extending therethrough, said member being concaved whereby it forms a seat corresponding to the convexed bottom 42ª of the inner ozonizing receptacle 42 and supports the same against lateral movement. At its upper end the supporting member is provided with an annular seat 40ª formed within and at the bottom of a centering wall 40ᵇ. Within this wall and resting on said seat is the outer ozonizing receptacle. The inner ozonizing receptacle is a glass tube 42 closed or seated at its bottom and rounded, as shown, and fitting within the concave seat provided therefor in the member 40; at its upper end it is also rounded and provided with a tubular neck 43. The interior surface of this receptacle is roughened, as by etching with hydrofluoric acid.

44 denotes the outer cylindrical wall of a double-walled glass receptacle surrounding the receptacle 42. This outer wall is cylindrical and is joined at its bottom with an inner wall 45, the walls providing therebetween an annular receptacle which is seated within the top of the member 40 in the manner described hereinbefore. The upper end of the wall 45 is rounded complementarily to the rounded upper end of the receptacle 42, and is provided with a neck 46 having therewithin a stopper 47, which may be of cork or any other suitable material, and through which the tubulure 43 of the tube 42 extends, this arrangement serving to position accurately and concentrically the upper part of the receptacle 42 and of the wall 45, thereby to maintain at constant width the air gap therebetween. The manner of supporting the lower and the upper ends of the ozonizing receptacles secures and maintains this uniform width of air gap, with a resultant uniform maximum efficiency in the ozonizing of the air passing through said gap. From one side of the upper end of the wall 45 there projects an outlet connection 48. The receptacle 42 is substantially filled with suitable electrolyte, such as a solution of calcium chloride in distilled water, while the annular receptacle formed between the walls 44 and 45 is also filled with such electrolyte. 49 and 50 denote the electrodes extending respectively into the electrolyte within the receptacle 42 and that within the annular receptacle provided between the walls 44 and 45. Each of these electrodes is preferably a lead wire encased in a glass tube, each wire terminating short of the lower end of its tube, whereby the glass wall of the surrounding tube will act as a non-conducting shield and prevent a direct discharge from the pointed end of the wire conductor to the dielectric wall.

With the parts constructed and arranged as described, it will be apparent that a part of the air from the drying tube is connected to the bottom of the ozone generator and is discharged upwardly through the annular chamber 51 formed between the inner and outer receptacles. This arrangement secures an extremely important advantage over the arrangement shown in the Knox patent referred to. The action of the ozone generator necessarily produces some heat. With the parts arranged as shown, this heat assists in the circulation of the air through the generator, due to the natural tendency of heated air to rise; in the construction shown in the patent, this natural tendency of the heated air to rise opposes such circulation. Where this circulation is opposed by the heat evolved in the operation of the generator, pinene vapor is liable to be sucked or drawn from the mixing chamber into the ozonizing space, where the lines of force break it up into pinonic acid and which acid is driven by the lines of force into the walls of the glass receptacles. Through this action, the proportions of pinene and ozone in the mixing chamber are rendered variable. Furthermore, the driving of the pinonic acid into the glass tubes necessitates frequent cleaning of the same, which is objectionable, not only on its own account, but as involving the breakage of a large proportion of such tubes; in fact, this necessity for cleaning these tubes (which are usually made of glass one-sixteenth inch thick) has resulted in breaking some sixty per cent of the tubes. A further disadvantage in the prior apparatus arose from the fact that the ozonizer would at times become excessively heated, gasifying or vaporizing the electrolyte and blowing the same out of the annular chamber formed between the walls 44 and 45. This resulted, not only in a waste of the electrolyte and a lowering of efficiency in the ozonizer, but in the frequent breaking of the glass receptacles and the necessity for frequent inspection and interruption of operation. By reversing the flow of air to be ozonized, passing it through the ozonizer upwardly, the natural tendency of heated air to rise is taken advantage of, the proportions of pinene and ozone in the mixing chamber remain constant, there is no vaporization or gasification of the electrolyte, no breakage of the glass receptacles, and no contamination of the ozone by pinonic acid, because of the isolation of the ozonizer, as to reverse circulation, from the mixing chamber. Furthermore, this reversal, coupled with the maintenance of a uniform air gap at 51, results in a uniform supply of ozone to the mixing chamber.

From the annular chamber 51, the ozone or ozonized air is conducted, through the outlet connection 48, connection 52, tube 53, and connection 54 to the top of the mixing chamber, which will be referred to hereinafter.

The air passing from the drying tube to the connection 34 is conducted to the evaporating tank through an elbow 55 having a valve 56 therein by which the proportions of air delivered respectively to the ozonizer and to the evaporating tank may be controlled and varied. From this elbow the air is conducted through the pipe connections 57 and 58 into the evaporating tank, which will now be described. This tank is shown as approximately rectangular in shape, one corner being cut away, as indicated at 59, for a purpose to be described hereinafter. Projecting downwardly from the cover 60 are baffles 61, said baffles being arranged so as to provide a long and tortuous passageway for air above the pinene in said tank, the flow of air through the tank being indicated by the arrows on Fig. 12. These baffles extend to about one-sixteenth inch from the bottom of the tank, which will obviously allow the level of the pinene in the tank to fall to about one-sixteenth inch from the bottom of the tank before any air can leave the tank except along the tortuous path described therefor. The cover is also provided with a sealing tube 63 having a flaring support for the shoulder of a pinene container bottle 62, the tube 63 extending to within about one-sixteenth of an inch of the bottom of the tank, the upper flaring end 64 of said tube cooperating with the shoulder of the bottle to support the same. The parts are so proportioned that the bottle will be supported with its mouth 62ª about midway between the cover 60 and the bottom of the tank. It will be evident that, with this arrangement, as long as there is any pinene in the bottle 62, an air gap of constant width, about half the depth of the tank, will be provided above the pinene in the tank. This secures absolute uniformity in the proportion of pinene conveyed to the mixing chamber. The glass bottle serves as an effective indicator whereby the user or operator may be informed as to the necessity for a new supply of pinene for the tank. Furthermore, should the operator neglect to replace the bottle 62, when empty, with a full one, or to refill said bottle, the pinene level within the tank may fall to within one-sixteenth inch of the bottom without permitting the air to circulate therethrough except in operative relation to the pinene throughout the entire length of the tortuous passageway. Furthermore, should the level fall below the constant level which it is desired to maintain, the period wherein this variation from normal condition continues will be so short that no serious detriment will result.

The pinene-laden air flows from the evaporating tank into the mixing chamber 65, said chamber being provided between a cover 66 and a bottom comprising two sections 67 inclined upwardly from opposite sides of a diagonal line 67ª and both sections being inclined toward a common outlet. The cover is provided with depending baffles which are so arranged as to form a preliminary receiving chamber for the ozone or ozonized air and the pinene laden air, with a tortuous passageway through which this mixture passes to the outlet connection whereby the molecules are thoroughly intermingled and the chemical combination ensues resulting in the production of pinene ozonide, said tortuous passageway being provided by baffles depending from the cover, and under and above which in alternation the mixture flows in its passageway to the outlet. These baffles are preferably provided within a quadrilateral chamber formed by walls depending from the cover, one of which 68 terminates short of the inclined bottom, providing a passageway for the mixture from the outside of such wall to the inside of the chamber. The baffles 69 substantially contact with the inclined bottom 67, but are spaced from the cover, providing each a passageway therebeneath, there being a final baffle 71 extending upwardly from the inclined bottom toward the cover and above which the mixture passes to the outlet connection 72 projecting from the cover.

As some pinonic acid is formed where the ozone and the pinene laden air first meet in the mixing chamber, means are provided for removing this pinonic acid to prevent it from contaminating the pinene. This means is afforded by the inclined bottom having at the lower end thereof a discharge outlet 73, said discharge outlet extending through said bottom, through the cover 74 (preferably rigid therewith) and into a receptacle 75 which may be conveniently and removably supported below the cover and within the corner recess 59, by means of a shelf 76 having a spring hinge connection 77 with the lower portion of the evaporating tank. This spring hinge tends to elevate the free end of the shelf and thereby to hold the receptacle 75 seated against its cover 74. The cover is shown as provided with a packing disk 78, of any suitable material.

After having been freed from pinonic acid, the pinene ozonide is discharged through the cover connection 79, glass tube 80, and connection 81 into the tubular neck 82 of the distributing globe 83. The lower end of the tube is sealed into the upper end of the connection 81, the same being preferably a casting comprising a horizontal flanged head 81ᵃ having a reduced threaded extension 81ᵇ therebeneath and a depending tube 81ᶜ, the tubular portion being inserted into the upper end of the glass tube 80. The upper end of the glass tube 80 bears against the packing washer 84 within an internally threaded sleeve 85, the ring being supported by an inturned flange 86 which closely surrounds the upper end of the tube 80, the packing being pressed against the top of the tube by a locking ring 85ᵃ threaded into said sleeve. The globe with its attached connection is fitted in place by threading the part 81ᵇ into the top of the sleeve 85.

Reference has been made hereinbefore to the electrical connections whereby the apparatus may be operated continuously or intermittently for any desired time interval. These connections are shown in detail in Figs. 13 to 16 inclusive and in diagram in Fig. 17.

It will be observed that the upper end of the sleeve 85 projects through the top 87 of the cabinet. This sleeve is conveniently formed as a casting having an arcuate flange 88 thereon provided with a scale having indications thereon of the "off" and "on" positions of the switch and the time intervals at which the apparatus is to operate intermittently. In the embodiment of the invention disclosed herein, these time intervals are multiples of fifteen minutes, the parts being so arranged that when the switch is moved to bring its indicator to the point "15", the apparatus will operate for fifteen minutes, whereupon it will be cut off automatically for the remaining forty five minutes of the hour. When set at "30", the apparatus will operate for thirty minutes and will be cut off for the remaining thirty minutes. When set at "45", the apparatus will operate for forty-five minutes and be cut off for the remaining fifteen minutes; when set to the "on" position, the apparatus will operate continuously until the switch is moved to the "off" position or any intermediate position. The sleeve 81 is conveniently secured to the top of the cabinet by means of screws 89 extending through radial ears 90 bearing on the top of the cabinet.

91 denotes an arcuate switch plate arranged outside of the sleeve 85 and concentric therewith and preferably located immediately below the top 87 of the cabinet. This plate is fastened to a similar arcuate fiber block 92, as by means of screws 93, the block in turn being fastened to an arcuate flange 94 depending from an annular plate 95 which surrounds the sleeve 81, beneath the flange 88 and within the ears 90. This annular plate is provided with an upwardly extending arm 96, provided with an operating handle 97, said arm having an indicator portion 98 cooperating with the scale or index on the plate or flange 88.

The switch plate 91 cooperates with an arcuate series of contacts, indicated generally at 99 (Fig. 15) and each comprising a sleeve 100 threaded into the supporting plate 101 carried by the top of the cabinet, each of the sleeves 100 having a helical spring 102 therein adapted to thrust a ball 103 upwardly into contact with the switch plate 91. Five such contacts are shown, and the three intermediate contacts are each electrically connected by conductors 104 with three of the four segmental contacts 105 (see Figs. 2 and 17) grouped about an arbor 106 driven at a constant speed, as by means of clock work mechanism, and carrying the wiping contact plate 107, said arbor being in the circuit including the contacts 99 and the segmental contacts 105.

The electrical connections whereby the apparatus is operated are shown diagrammatically in Fig. 17, wherein 108 and 109 represent the wires leading from the usual source of supply, such as an electric lamp socket. The wire 108 is connected at one side of the motor 7 and the wire 109 at the opposite side, whereby the motor may be operated in the usual manner to drive the fan. The wire 108 is also connected with the primary winding 110 of a high frequency transformer, the secondary winding 111 whereof is in circuit with the ozone generator, whereby the current used for such generator will be a current of short wave length having a pressure of approximately 9,000 volts, rendering it most efficient for the ozonization of the air. One branch 112 of the wire 108 leads to the contact 99 at one end of the segmental series and from said contact to the central contact member (the arbor 106) of the time-control contacts while a branch 113 of the wire 109 leads to the contact at the opposite end of the series 99. The other three contacts of this series, as previously pointed out, are connected to three of the four segmental contacts 105. With this arrangement, and assuming that the arbor 106 makes one revolution per hour and that the switch plate is in the position shown in Fig. 17, the circuit through the contacts 105 and arbor 106 will be closed for three-quarters of an hour—until the switch blade 107 reaches the segmental contact which has no connection with a contact 99, with the result that the apparatus will operate for forty-five minutes and will remain inoperative for fifteen minutes. In this position the indicator 98 will be opposite the mark "45". By moving the plate 91 a step to the right, the plate will pass off the contact next to the left hand end, thus leaving only two of the segments 105 alive; with this arrangement the current will be on the apparatus for half an hour and then off for half an hour. In like manner, by moving the indicator another step to the right, but one of the segments 105 will be a live segment and the apparatus will operate for fifteen minutes only with a rest period of forty-five minutes, the indicator being in the meantime the point "15" on the scale. When the plate 91 is moved so that its left hand end engages the left hand contact 99, the time controlling devices are short-circuited through the plate and the apparatus works continuously. When the plate is moved the full distance to the right, the electrical connections are broken entirely and the apparatus is inoperative, the full "on" and full "off" conditions being indicated by the position of the indicator 98 with reference to the index or scale.

Reference has been made hereinbefore to the fact that the electrolyte does not become overheated in this apparatus. This result is due in part to the natural circulation provided by the air to be ozonized. This, however, is not the only reliance against such overheating. The fan 6 is of such capacity and driven at such speed that the air brought into the apparatus thereby is far in excess of that required for the production of pinene ozonide. The amount of air that is required for the production of such pinene ozonide is controlled by the valve 13. The excess air does not enter the drying tube, but is driven in part through a pipe 114, the delivery end whereof is opposite the central portion of the ozonizing tubes—see Figs. 2 and 3. This surplus air maintains the ozone generator at a temperature which will enable it to function most effectually and at the same time avoids the liability of breaking glass tubes due to overheating.

The other portion of the excess air which is delivered to the apparatus is directed through a tube 115 to the motor casing and is circulated in operative relation to the motor parts, thereby preventing the same from becoming overheated. It will be observed that the casing or cabinet is provided with apertures 116 located near the top and bottom thereof in front of the partition 117; also with apertures 118 located near the top and bottom thereof and at the rear of said partition. The casing is provided with front and rear doors 119, 120. In operation, these doors should be closed, and the air which is supplied by the fan to the interior of the casing, in addition to cooling the motor and the ozone generator, will circulate within the casing and be discharged through the appropriate sets of openings. This circulation of air prevents the entrance of dust and of pinene ozonide into the casing, thereby protecting the parts of the motor and the apparatus within the casing from injurious effects due to the access thereto of the dust and pinene ozonide, or other injurious material.

A further and valuable feature of the invention resides in the fact that the fan is so proportioned and driven that the air supplied through the flexible inlet tube 1 moves at a velocity of about five hundred feet per minute. This renders the apparatus practically immune from outside wind conditions, and especially where, in addition to such velocity, the controlling valve 13 is interposed.

Reference has been made hereinbefore to the casing or cabinet in which the operating parts of the apparatus are enclosed. This cabinet is made of a multiplicity of plies of veneer, whereby liability of warping is precluded.

This application is a continuation of my application, Serial No. 229,018, filed April 17, 1918.

Having thus described my invention, what I claim is:

1. In an apparatus for producing gaseous ozonides, the combination, with an ozone generator, an evaporator, and a mixing chamber, of a drier communicating with said generator and evaporator, means for supplying air to said drier, and means for directing additional air in cooling relation to said generator.

2. In an apparatus for producing gaseous ozonides, the combination, with an ozone generator, an evaporator, and a mixing chamber, of a motor, an air moving device driven by said motor, a drier communicating with said device and with said generator and said evaporator, and means for directing air from said device in cooling relation to said generator and said motor.

3. In an apparatus for producing gaseous ozonides, the combination, with an ozone generator, an evaporator, and a mixing chamber, of a motor, an air moving device driven by said motor, a drier communicating with said device and with said generator and said evaporator, a casing enclosing the aforesaid generator and motor, and means for circulating air from said device through said casing and in cooling relation to said generator and motor.

4. The combination, with an ozone generator comprising an air supply and an annular chamber through which air to be ozonized is conducted, of means for maintaining uniform the width of such annular chamber, a liquid-containing tank, an air supply to said tank, means for maintaining constant the width of the passageway for air through said tank and above the liquid therein, and a mixing chamber to which the vapor-charged air and the ozone from the generator are conducted.

5. In an apparatus of the character described, the combination of an ozone generator, means for supplying air thereto, an evaporator, means for supplying air thereto, a mixing chamber, connections for supplying thereto ozone from the generator and saturated air from the evaporator, and means for maintaining constant the proportions of ozone and saturated air supplied to the mixing chamber.

6. In an apparatus of the character described, the combination of an ozone generator having a passageway for air to be ozonized, an evaporating tank having a passageway for air to be saturated by exposure to liquid therein, a mixing chamber connected to said passageways, means for supplying air to said passageways, and means for maintaining substantially constant the cross-sectional area of each of said passageways.

7. An ozone generator having in combination a vertical passageway therethrough for air to be ozonized and a mixing chamber, connections between the upper end of said passageway and the mixing chamber, means for supplying air to the bottom of said passageway, and means for directing a current of air in operative relation to said generator thereby to cool the same.

8. An ozone generator comprising in combination a drying device and a pair of concentrically arranged tubes providing a vertical annular passageway for air therebetween, connections for supplying air from the drying device to the bottom of said passageway, and means for supporting said tubes in concentric relation whereby a constant width of annular passageway therebetween will be preserved.

9. An ozone generator comprising in combination a pair of concentrically arranged receptacles providing a vertical annular passageway therebetween for air to be ozonized, means for supplying air to the lower end of said passageway, and a conduit extending from the upper end of said passageway.

10. In an apparatus of the character described, the combination with an ozone generator and a saturating tank, of a motor, a fan driven thereby, connections for supplying a part of the air delivered by said fan to said generator and to said tank, means for controlling the volume and velocity of the air so supplied to the generator and tank, and a bypass connection for excess air leading in operative relation to the generator.

11. In an apparatus of the character described, the combination, with an ozone generator and a saturating tank, of a motor, a fan driven thereby, connections for supplying a part of the air delivered by said fan to said generator and to said tank, means for controlling the volume and velocity of the air so supplied to the generator and tank, and a bypass connection for excess air leading in operative relation to said motor.

12. In an apparatus of the character described, the combination, with a mixing chamber and means for supplying ozone thereto, of an evaporating tank having a cover, an inlet connection projecting into said tank and adapted to maintain the level of the liquid therein at a constant distance below said cover, a receptacle supported in operative relation to said connection, and means for circulating air through said tank above the surface of the liquid therein and for conducting the air thus saturated to said mixing chamber.

13. The combination, with an evaporating tank provided with a cover having a series of baffles providing a continuous extended passageway for the circulation of air above the liquid contained in said tank at one end of said passageway, of a tube projecting downwardly into said tank, and a receptacle supported mouth downward in position to discharge into said tube, the said tube serving to maintain the liquid in said tank at a uniform distance below the said cover.

14. In an apparatus of the character described, the combination, with a mixing chamber, and means for supplying ozone thereto, of an evaporating tank having a cover and means for maintaining the liquid therein at a uniform distance below said cover and means providing a tortuous passageway for air above such liquid and below said cover, connections for supplying air to one end of such passageway, and connections leading from the other end of such passageway to the mixing chamber.

15. In apparatus of the character described, the combination, with a mixing chamber and means for supplying ozone thereto, of an evaporating tank having a cover, means for maintaining substantially constant the distance of the liquid in said tank from said cover, means for supplying air to said tank above the level of the liquid maintained therein, and means for conducting the vapor-laden air from the tank to the mixing chamber.

16. The combination, with a mixing chamber and means for supplying ozone thereto, of an evaporator tank having a cover provided with a series of downwardly directed baffles extending approximately to the bottom of said tank and forming a continuous tortuous passageway, there being a connection for supplying air to one end of said passageway and for conducting vapor-laden air from the other end of said passageway, and means for supplying liquid to said tank, said means comprising a tube carried by the cover and extending to substantially the bottom of the tank, and a receptacle supported with its mouth directed downwardly in said tube, whereby the level of liquid in said tank will normally be maintained at a constant distance below said cover and the circulation of air through the tank above the liquid therein may proceed without admission of extraneous air until substantially the entire liquid contents of the tank have been evaporated.

17. In an apparatus of the character described, the combination, with an air drying device, of an ozone generator comprising a pair of concentrically spaced receptacles providing therebetween a vertically extending annular passageway, a conduit for air extending from the drying device to the bottom of said passageway, there being an outlet connection extending from the top of such passageway, and means supporting said receptacles and maintaining the same in concentric relation whereby the width of the annular passageway provided therebetween will remain constant.

18. In an apparatus of the character described, the combination, with an air drying device, of an ozone generator comprising a pair of concentrically spaced receptacles providing therebetween a vertically extending annular passageway, and a conduit for air extending from the drying device to the bottom of said passageway, there being an outlet connection extending from the top of such passageway.

19. In an apparatus for producing gaseous ozonides, the combination, with a mixing chamber having an inlet and an outlet and means for supplying a mixture of gaseous and vaporous fluids to such inlet, of a series of baffles interposed between the inlet and the outlet, said chamber having a downwardly inclined bottom and a discharge opening at the lower end of such bottom, and a receptacle arranged to collect matter discharged through said opening.

20. In apparatus for producing gaseous ozonides, the combination of a mixing chamber and means for supplying thereto gaseous and vaporous fluids, an outlet connection, a series of baffles interposed between the inlet connection and the outlet connection, an inclined bottom below said baffles, there being a discharge outlet at the lower end of such inclined bottom, a receptacle adapted to receive material discharged through said opening, and means yieldingly holding said receptacle in operative relation to said opening.

21. In an apparatus for producing gaseous ozonides, the combination, with a mixing chamber having an outlet opening in the bottom for impurities, of a shelf, a receptacle mounted on said shelf and adapted to receive material discharged through said opening, means cooperating with said shelf thereby to hold the receptacle in operative relation to said opening, and means for supplying gaseous and vaporous fluids to said chamber.

22. In an apparatus for producing gaseous ozonides, the combination, with an evaporating tank having a cover provided with a series of downwardly directed baffles and inlet and outlet connections for air located at opposite ends of said series and providing a continuous tortuous passageway for air above the liquid in said tank, of a liquid receptacle adapted to discharge into the tank, connections whereby the liquid received in the tank from the said receptacle will be maintained at a predetermined distance below said cover, and means for supplying a gaseous fluid to said tank.

23. In an apparatus for producing gaseous ozonides, the combination, with an evaporating tank having a cover provided with a series of downwardly extending baffles and provided at one end of said series with an inlet connection for air and at the other end of said series with an outlet connection, said cover having a tube projecting downwardly therefrom, of a receptacle above the cover and adapted to discharge through said tube, said tube serving to maintain the liquid in said tank at a constant distance below said cover.

24. An air drying device for ozonizers comprising a receptacle for a drying agent, a fluid connection leading to the bottom of said receptacle, and a dome shaped wall above said connection for supporting the drying agent, said wall having perforations and rounded projections intermediate of such perforations, there being an outlet from the upper end of said receptacle for the fluid conducted therethrough.

25. An air drying device for ozonizers comprising a receptacle for a drying agent having a connection at its bottom for the admission of the fluid to be dried, an outlet at its top for the fluid dried by exposure to said agent, and a support for the drying agent interposed between the inlet connection and the drying chamber proper, said support being downwardly inclined from the central portion thereof and being provided with openings therethrough and with projections intermediate of said openings.

26. In an apparatus of the character described, the combination, with an ozone generator and an evaporator, of an air drier, connections for delivering air from said drier to said generator and to said evaporator, an air-moving device for supplying air to said drier, means for controlling the amount of air supplied by the said device to said drier, and an outlet interposed between the said device and the said drier for air supplied by the said device in excess of that required for the generator and evaporator.

27. In an apparatus of the character described, the combination, with an ozone generator, and an evaporator, of an air drier, connections for delivering air from the said drier to said generator and said evaporator, a device for supplying air to said drier, a duct connecting the device with the said drier, the said duct having an outlet, and a controlling device in said duct for varying the amount of air supplied by the said device to the said drier and to the said outlet.

28. In an apparatus of the character described, the combination, with an ozone generator and an evaporator, of a drier, connections for delivering air from said drier to said generator and said evaporator, a device for supplying air to the said drier, a duct connecting the said device with the said drier, the said duct being provided with a bypass, and means in said duct for controlling the distribution of air from the said device to the said drier and to the said bypass.

In testimony whereof, I hereunto affix my signature.

ERNEST J. BAGNALL.